US008315343B2

(12) United States Patent
Murai et al.

(10) Patent No.: US 8,315,343 B2
(45) Date of Patent: Nov. 20, 2012

(54) MULTI-ANTENNA RECEIVER INTERFERENCE CANCELLATION METHOD AND APPARATUS

(75) Inventors: Hideshi Murai, Kanagawa (JP); Bo Goransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 258 days.

(21) Appl. No.: 12/808,232

(22) PCT Filed: Dec. 17, 2007

(86) PCT No.: PCT/SE2007/051014
§ 371 (c)(1),
(2), (4) Date: Jun. 15, 2010

(87) PCT Pub. No.: WO2009/078766
PCT Pub. Date: Jun. 25, 2009

(65) Prior Publication Data
US 2010/0272220 A1   Oct. 28, 2010

(51) Int. Cl.
*H04B 1/10* (2006.01)
(52) U.S. Cl. ........ 375/346; 375/260; 375/267; 375/299; 375/316; 375/340; 375/347; 375/350; 455/101; 455/132; 455/296; 455/500; 455/562.1; 370/334; 370/335; 370/342; 341/173; 341/180; 327/551
(58) Field of Classification Search ............... 375/260, 375/267, 299, 316, 340, 346, 347, 350; 455/101, 455/132, 296, 500, 562.1; 370/334, 335, 370/342; 341/173, 180; 327/551
See application file for complete search history.

(56) References Cited

U.S. PATENT DOCUMENTS

| 2004/0165675 A1 | 8/2004 | Ito et al. |
| 2007/0195738 A1 | 8/2007 | Kim |

(Continued)

FOREIGN PATENT DOCUMENTS

EP   1530335 A2   5/2005

(Continued)

OTHER PUBLICATIONS

Kim, H. et al. "Iterative Interference Cancellation Algorithms for the V-BLAST System." 2005 IEEE 16th International Symposium on Persona, Indoor and Mobile Radio Communications, vol. 4, Sep. 11-14, 2005, pp. 2435-2440.

(Continued)

*Primary Examiner* — Leon Flores
(74) *Attorney, Agent, or Firm* — Coats & Bennett, P.L.L.C.

(57) ABSTRACT

A composite signal including a plurality of component signal streams is processed using QR-decomposition to detect symbols and calculate a decision metric for each of the signal streams (202). Soft serial interference cancellation is performed on the composite signal based on the symbols detected for different ones of the signal streams and a ranking of the signal streams (204). The symbols are re-detected and the decision metric re-calculated for each signal stream based on soft serial interference cancellation results (206). The different decision metric calculations for at least one of the signal streams are compared to determine whether symbol detection is more accurate with or without soft serial interference cancellation (208). The signal streams are decoded using symbols detected based on soft serial interference cancellation results when symbol detection is determined to be more accurate with soft serial interference cancellation (210). Otherwise, the streams are decoded based on the symbols detected using QR-decomposition (210).

23 Claims, 7 Drawing Sheets

U.S. PATENT DOCUMENTS

2007/0197166 A1* 8/2007 Kawamoto et al. ............ 455/65
2010/0150279 A1* 6/2010 Arar ............................ 375/340

FOREIGN PATENT DOCUMENTS

JP 2005143115 A 6/2005

OTHER PUBLICATIONS

Kawamoto, J. et al. "Performance Comparisons Between OFDM and DD-CDMA Radio Access Using MIMO Multiplexing in Multi-path Fading Channels." 2005 IEEE 62nd Vehicular Technology Conference, vol. 1, Sep. 25-28, 2005, pp. 103-108.

Lai, T. X. et al. "An iterative QR-SIC Receiver for Concatenated Space Frequency Coding Schemes in Severe Multipath Channels." 2006 IEEE Global Telecommunications Conference, Nov. 2006, pp. 1-5.

Watanabe, T. et al. "A Study on MIMO System with QR Decomposition and Soft interference Canceller." The Institute of Electronics, Information and Communication Engineers, Nov. 2005.

Ahn, C.-J. et al. "Multiple Transposed Channel Matrix QR Decompositions based Sphere Detection Algorithm for MLD-SDM/OFDM." IEICE Technical Report, vol. 105, No. 196, pp. 43-47, 2005.

Chung, S. T. et al/ "Approaching Eigenmode BLAST Channel Capacity Using V-BLAST with Rate and Power Feedback." IEEE 54th Vehicular Technology Conference (VTC2001-Fall), Oct. 2001.

Golden, G. D. et al. "Detection Algorithm and Initial Laboratory Results using V-BLAST Space-Time Communication Architecture." Electronics Letters, vol. 35, No. 1, Jan. 7, 1999.

Grant, S. et al. "Per-Antenna-Rate-Control (PARC) in Frequency Selective Fading with SIC-GRAKE Receiver." 2004 IEEE 60th Vehicular Technology Conference (VTC2004-Fall), vol. 2, Sep. 26-29, 2004, pp. 1458-1462.

Higuchi, K. et al. "Multi-Antenna Wireless Transmission Technology: Part3 Signal Separation Technologies for MIMO Multiplexing." NTT DoCoMo Technical Journal, vol. 14, No. 1, pp. 66-75, Apr. 2006.

Murch, R. D. et al. "Antenna Systems for Broadband Wireless Access." IEEE Communications Magazine, vol. 40, No. 4, Apr. 2002, pp. 76-83.

* cited by examiner

MULTI-ANTENNA RECEIVER INTERFERENCE CANCELLATION METHOD AND APPARATUS

TECHNICAL FIELD OF THE INVENTION

The present invention generally relates to multiple-input multiple-output (MIMO) based communication networks, and particularly relates to cancelling signal interference in MIMO based networks.

BACKGROUND

MIMO (Multiple Input and Multiple Output) is an essential technology to increase peak data rate or throughput for wireless communications. In a MIMO-based system, the transmitter has multiple antennas for transmitting information to a receiver. Each transmit antenna radiates energy representing the signal being transmitted. The receiver also has multiple antennas for receiving the transmitted signals. The signal received at each antenna has contributions from different ones of the transmit antennas. In a case of multi-layer transmission, where different transmission antenna transmit different information and in a case where there is no feedback information about the channel to the transmitter, the receiver attempts to separate out the different transmit antenna signal components.

A MIMO-based receiver separates out the signal received at the same antenna into respective individual signal streams transmitted from each transmit antenna. As for signal separation processing, MLD (Maximum Likelihood Detection), which could extract antenna diversity gain, gives the best performance. MLD calculates a metric based on squared Euclidean distance for every possible combination of modulation signals from received signals and selects the modulation signal combination which shows the maximum likelihood (minimum sum of the metric corresponds to the combination of modulation signal over streams). The complexity associated with MLD increases exponentially as a function of modulation order or number of transmit antenna, and thus becomes even more impractical for advanced wireless communication networks.

One conventional approach for separating out multiple antenna signal streams based on MLD involves combining QR-decomposition with the M-algorithm (QRM-MLD). QRM-MLD reduces the amount of signal processing compared to MLD while yielding similar performance. QR-decomposition involves decomposing a composite channel matrix associated with all signal propagation paths into a unitary matrix Q and an upper-triangular matrix R. The Hermitian matrix of Q is then calculated and multiplied with the matrix representing all received signal streams. This yields an upper-triangular matrix for the desired signal streams, plus noise. The bottom row of the resulting matrix includes only a particular signal stream without any interference from the other signal streams. This reduces the amount of signal processing resources needed to cancel inter-stream interference. Next, the M-algorithm selects a number of symbols according to the branch metric by M in metric calculation to compare at each stage corresponding to transmit antenna which further reduces the amount of metric calculations. However, QR-MLD still tends to be overly complex.

Another conventional approach employed in multi-antenna receivers is Successive Interference Cancellation (SIC). According to SIC, received signal streams are ranked, e.g., based on received power. The highest ranking stream is selected and a replica of that signal is regenerated based on symbols detected for that signal and the estimated channel response associated with the signal. The signal replica is then subtracted from the composite signal, cancelling the signal's influence on the composite signal. This way, symbols for the remaining signal streams can be detected absent interference from cancelled signal streams. The SIC process continues until all signal streams are detected. Detection performance improves with SIC as more signal streams are cancelled because the remaining signal streams can be detected with less interference. However, the performance of SIC is typically worse than MLD because antenna diversity gain is not expected for the first signal stream and only $2^{nd}$ order diversity gain is expected for the second signal stream and so on. Generally, when the number of Tx antenna is T and the number of Rx antenna is R, ideal diversity order expected at n-th stream signal detection using SIC is (R−T+n) because it includes the signal of stream by (T−n+1) among R antennas at n-th signal stream detection. This may result in improper signal stream detection which in turn causes an erroneous signal replica to be cancelled, increasing interference for the remaining signal streams.

Yet another conventional interference cancellation approach involves combining iterative soft cancellation with parallel-type interference cancellation, e.g., as disclosed in the Watanabe et al. IEICE article entitled "A Study of MIMO System with QR Decomposition and Soft Interference Canceller", IEICE Technical Report, RCS2005-112, pp. 31-36, November 2005. This approach uses iterative parallel interference cancellation using soft values which could get receiver diversity gain and suppress error propagation. QR decomposition gives fairly good performance in the initial estimation and cancellation resulting in quick convergence in iterative parallel soft interference cancellation. Then, this approach yields results similar to MLD, but with reduced processing. However, complexity is still impractical as well as QRM-MLD and it requires many turbo decoder iterations increasing the time needed to perform signal detection.

SUMMARY

According to the methods and apparatus taught herein, a multi-antenna receiver uses QR-decomposition to detect symbols and calculate a decision metric such as Log Likelihood Ratio (LLR) for each received signal stream over one Transmission Time Interval (TTI) such as one frame or one sub-frame. The receiver then performs soft serial interference cancellation and redetects the symbols and recalculates the decision metric for each received signal stream based on the soft serial interference cancellation results. The decision metric indicates whether symbol detection is more accurate with or without soft serial interference cancellation. Comparing the decision metric calculations for at least one of the signal streams allows the receiver to determine whether soft serial interference cancellation improves symbol detection accuracy. If so, the symbols detected based on the interference cancellation results are decoded and coherently combined to detect the transmitted signal. Otherwise, the symbols detected before interference cancellation was performed are decoded. This way, the more accurate group of detected symbols is used to decode the transmitted signal. For example, if soft serial interference cancellation yields too many symbol detection errors as indicated by the decision metric, the resulting symbols are not decoded. Instead, the symbols detected based on the QR-decomposition results are decoded.

Moreover, the multi-antenna receiver can attempt at least once to re-decode unsuccessfully decoded signal streams. That is, if one or more signal streams are not properly decoded, the corresponding decoding results pend while the receiver attempts to decode the remaining signal streams. Accordingly, the receiver does not stop decoding because one signal stream was improperly decoded. Instead, the receiver attempts at least once to re-decode any unsuccessfully decoded signal streams. Decoding accuracy is further improved because interference from successfully decoded signal streams is cancelled from the composite signal before re-decoding is attempted. This way, when the receiver attempts to re-decode unsuccessfully decoded signal streams, it does so absent interference from successfully decoded streams. The receiver may optionally re-rank the unsuccessfully decoded signal streams based on the decision metric calculations before attempting to re-decode the symbols. This further improves re-decoding accuracy because the signal streams most likely to be re-decoded successfully are processed first and their contribution removed before the receiver attempts to re-decode the remaining signal streams. Attempting more than once to re-decode signal streams reduces the number of Negative Acknowledgement (NACK) requests issued by the receiver, improving data throughput.

According to one embodiment, a composite signal including a plurality of component signal streams received by a multi-antenna receiver is processed by using QR-decomposition to detect symbols and calculate a decision metric for each of the signal streams. Soft serial interference cancellation is performed on the composite signal based on the symbols detected for different ones of the signal streams and a ranking of the signal streams. The symbols are re-detected and the decision metric re-calculated for each signal stream based on the soft serial interference cancellation results. The different decision metric calculations for at least one of the signal streams are compared to determine whether symbol detection is more accurate with or without soft serial interference cancellation. The signal streams are decoded using the symbols detected based on the soft serial interference cancellation results when symbol detection is determined to be more accurate with soft serial interference cancellation. Otherwise, the signal streams are decoded based on the symbols detected using QR-decomposition.

Summarizing the potential effect each component provides, multi-stage iterative soft serial cancellation yields receive antenna diversity gain, soft interference cancellation reduces error propagation due to symbol detection error or decoding error, QR decomposition reduces symbol detection error, and selection between detected symbols with and without cancellation based on a metric reduces decoding error. Of course, the present invention is not limited to the above features and advantages. Those skilled in the art will recognize additional features and advantages upon reading the following detailed description, and upon viewing the accompanying drawings.

DETAILED DESCRIPTION

Figure 1:
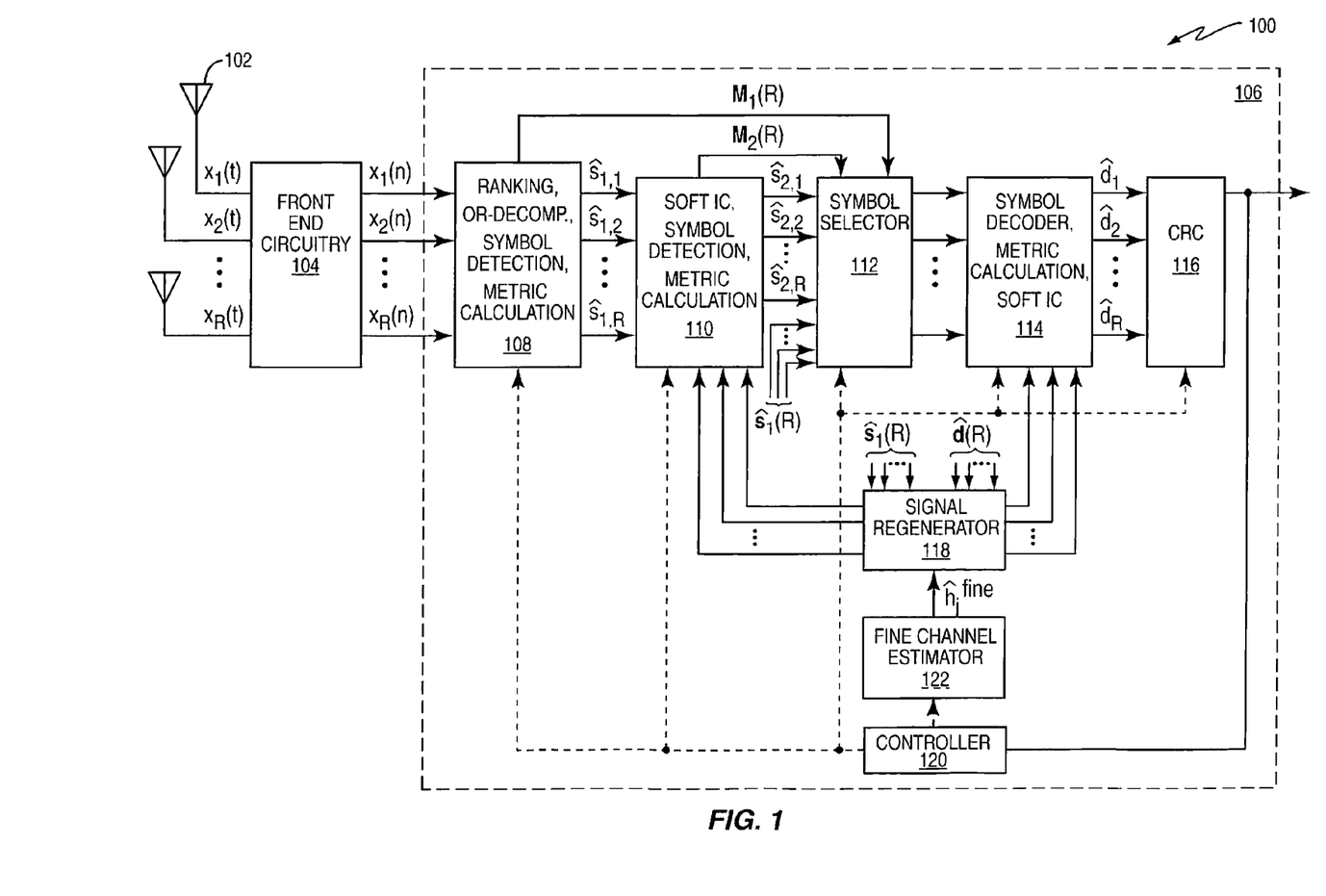
FIG. 1 is a block diagram of an embodiment of a multi-antenna receiver.

FIG. 1 illustrates an embodiment of a receiver 100 having R antennas 102 for receiving a signal transmitted over different signal propagation paths. The signals as a function of time (t) $x_1(t), x_2(t), \ldots, x_R(t)$ received at the different antennas 102 each have contributions from different ones of the transmit antennas (not shown). The received signals are filtered, down-converted and digitized by front end circuitry 104 to form corresponding baseband signal streams as a function of symbol index (n) $x_1(n), x_2(n), \ldots, x_R(n)$. The composite baseband signal vector $x=[x_1(n), x_2(n), \ldots x_R(n)]^T$ is processed by a baseband processor 106 included in the receiver 100 to decode the transmitted signal.

In one embodiment, the baseband processor 106 detects symbols for each signal stream before and after performing interference cancellation on the composite baseband signal. A decision metric is also calculated for each signal stream before and after interference cancellation. The decision metric indicates symbol detection accuracy. The baseband processor 106 compares the decision metric calculations for at least one of the signal streams to determine whether symbol detection is more accurate with or without interference cancellation. If more accurate, the baseband processor 106 uses the symbols detected based on the interference cancellation results to decode the transmitted signal. Otherwise, the symbols detected before interference cancellation are used for decoding. This way, the more accurate group of symbols is used to decode the transmitted signal.

In another embodiment, the baseband processor 106 attempts at least once to re-decode unsuccessfully decoded signal streams. This way, signal decoding does not stop if only a single stream is incorrectly decoded. Instead, the baseband processor 106 makes at least one attempt to re-decode unsuccessfully decoded signal streams before requesting re-transmission. Accordingly, the baseband processor 106 not only uses the more accurate group of detected symbols to decode the transmitted signal, the baseband processor 106 also attempts to re-decode unsuccessfully decoded signal streams at least once before requesting re-transmission because subtracting interference when decoding is successful could reduce interference and improve decoding performance at the next trial. The baseband processor 106 thus not only improves signal decoding accuracy, it also improves data transmission throughput by reducing the number of signal re-transmission requests (e.g., NACKs) made by the receiver 100.

In more detail, the baseband processor 106 includes a plurality of stages 108-116 for processing the composite baseband signal $x=[x_1(n), x_2(n), \ldots x_R(n)]^T$ to recover the transmitted signal. For ease of explanation and illustration only, the number of transmitted symbol streams is the same as the number of receive antennas 102 (R). However, this may not always be the case. Accordingly, the equations and corresponding Figures described herein can be readily modified to include an additional index (not shown) for generalizing to any number of transmit and receive antennas. Thus, any number of transmit and receive antennas can be handled by the embodiments described herein. With this understanding, the different stages 108-116 may be implemented as separate logical and/or software stages. Alternatively, the different baseband processor stages 108-116 may be implemented as a single logical entity and/or software program. Either way, the stages 108-116 shown in FIG. 1 merely illustrate the various signal processing functions carried out by the baseband processor 106 and should not be construed or otherwise limit the claimed invention to a particular physical arrangement of logic and/or software elements.

Figure 2:
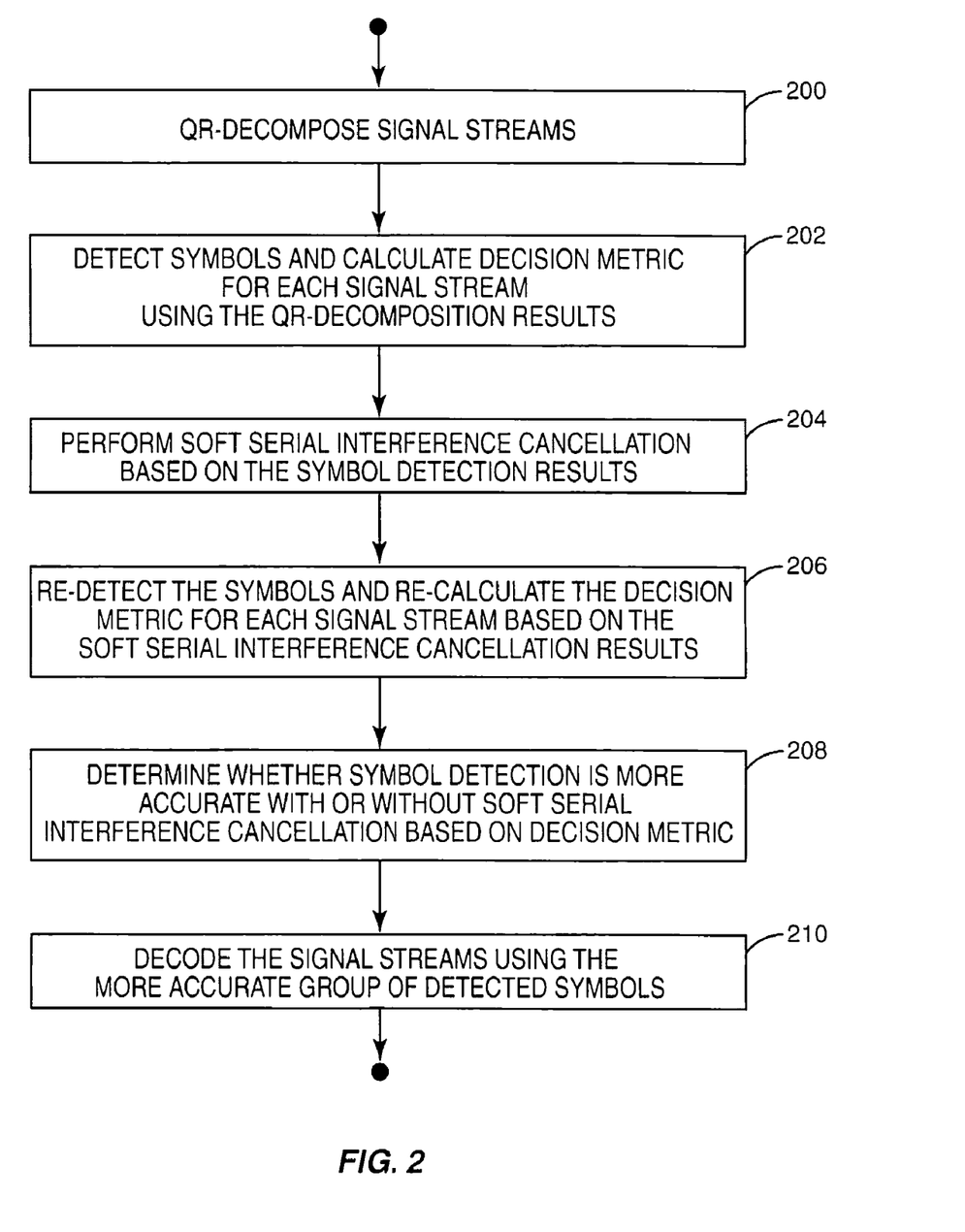
FIG. 2 is a logic flow diagram of an embodiment of processing logic for cancelling interference by a multi-antenna receiver.

The first baseband processor stage 108 applies QR-decomposition to the received signal streams $x_1(n), x_2(n), \ldots, x_R(n)$, e.g., as illustrated by Step 200 of FIG. 2. The first stage 108 detects symbols $\hat{S}_1(R) = \hat{s}_{1,1}, \hat{s}_{1,2}, \ldots, \hat{s}_{1,R}$ and calculates a decision metric $M_1(R) = m_{1,1}, m_{1,2}, \ldots, m_{1,R}$ for each signal stream $x_1(n), x_2(n), \ldots, x_R(n)$ based on the QR-decomposition results, e.g., as illustrated by Step 202 of FIG. 2. The second baseband processor stage 110 performs soft serial interference cancellation on the composite baseband signal x using the first group of detected symbols $\hat{S}_1(R)$, e.g., as illustrated by Step 204 of FIG. 2. The interference cancellation is considered "soft" because symbol estimates (i.e., detected symbols) are used, not actually decoded symbols. The second stage 110 also re-detects the symbols $\hat{s}_{2,1}, \hat{s}_{2,2}, \ldots, \hat{s}_{2,R} = \hat{S}_2(R)$ and re-calculates the decision metric $m_{2,1}, m_{2,2}, m_{2,R} = M_2(R)$ for each signal stream averaged over symbols within one transmit time interval (typically one frame or one-sub frame) based on the soft serial interference cancellation results, e.g., as illustrated by Step 206 of FIG. 2.

The third baseband processor stage 112 compares the different decision metric calculations for at least one of the signal streams to determine whether symbol detection is more accurate with or without soft serial interference cancellation, e.g., as illustrated by Step 208 of FIG. 2. In one embodiment, LLR is used as the decision metric. In another embodiment, the decision metric is a SINR (signal to interference-plus-noise ratio). In yet another embodiment, the Modulation and Coding Set (MCS) associated with each signal stream is used as the decision metric. Those skilled in the art will readily recognize that other metrics suitable for indicating symbol detection accuracy may also be used. Regardless, if the decision metric indicates symbol detection is more accurate without soft serial interference cancellation, the third stage 112 selects the first group of symbols $\hat{S}_1(R)$ detected based on the QR-decomposition results. Otherwise, the third stage 112 selects the second group of symbols $\hat{S}_2(R)$ detected based on the interference cancellation results.

The fourth baseband processor stage 114 decodes the different signal streams using the selected group of symbols, e.g., as illustrated by Step 210 of FIG. 2.

Accordingly, the fourth stage 114 performs symbol decoding based on the soft serial interference cancellation results when the decision metric indicates that interference cancellation yields more accurate symbol detection results. Otherwise, the signal streams are decoded based on the QR-decomposition results. The fourth stage 114 may decode the signal streams via any known symbol decoding technique.

The fifth baseband processor stage 116 determines whether individual ones of the signal streams are decoded properly. In one embodiment, the fifth stage 116 calculates a cyclic redundancy check (CRC) value for each signal stream as is well known in the art. The CRC value indicates whether symbols detected for a particular signal stream are properly decoded. If so, the received signal stream is regenerated possibly with some weighting and partly removed from the composite baseband signal so that its signal contribution is partly cancelled. This way, the remaining signal streams can be decoded reduced or ideally absent interference from previously decoded signal streams. In one embodiment, a signal stream may be regenerated by re-encoding decoded symbols to corresponding soft symbol estimates. The soft symbol estimates are subjected to an estimate of the channel (i.e., signal propagation path) that carried the signal stream as given by:

$$x_{regen} = \alpha \cdot H_j^{est}(k,n) \cdot s_j^{regen}(k,n) \quad (1)$$

where $x_{regen}$ approximates the original signal as received at one of the antennas, $\alpha$ represents a weighting factor based on LLR (or mutual information in another embodiment), which depends on how much re-generation signal is correct, $H_j^{est}$ represents the channel estimate associated with the regenerated signal, and $s_j^{regen}$ represents the regenerated symbol values.

On the other hand, the decoding results for unsuccessfully decoded signal streams pend until the fourth stage 114 decodes all signal streams a first time. If one or more signal streams are not properly decoded, the baseband processor 106 attempts at least once to re-decode them. This way, the receiver 100 does not prematurely request signal stream re-transmissions. Instead, the baseband processor 106 attempts at least one more time to decode unsuccessfully decoded signal streams.

For example, assume that the mth signal stream $x_m(n)$ was initially decoded incorrectly. The signal contribution associated with each signal stream successfully decoded after $x_m(n)$ is removed from the composite baseband signal. This way, when the baseband processor 106 attempts to re-decode $x_m(n)$, it does so absent interference from each signal stream successfully decoded after signal stream $x_m(n)$. During the initial decoding iteration, signal interference from streams $x_{m+1}(n), x_{m+2}(n), \ldots, x_R(n)$ was present when $x_m(n)$ was first decoded. However, if any of the signal streams $x_{m+1}(n), x_{m+2}(n), \ldots, x_R(n)$ were initially decoded correctly, the corresponding interference is removed before the baseband processor 106 attempts to re-decode $x_m(n)$. This improves overall receiver performance and reduces the number of signal re-transmission requests made by the receiver 100. Finally, a typical system sends ACK (acknowledgement) for streams which are successfully decoded. Otherwise, it sends NACK (not acknowledgement) requesting re-transmission for streams which are not successfully decoded.

Figure 3:
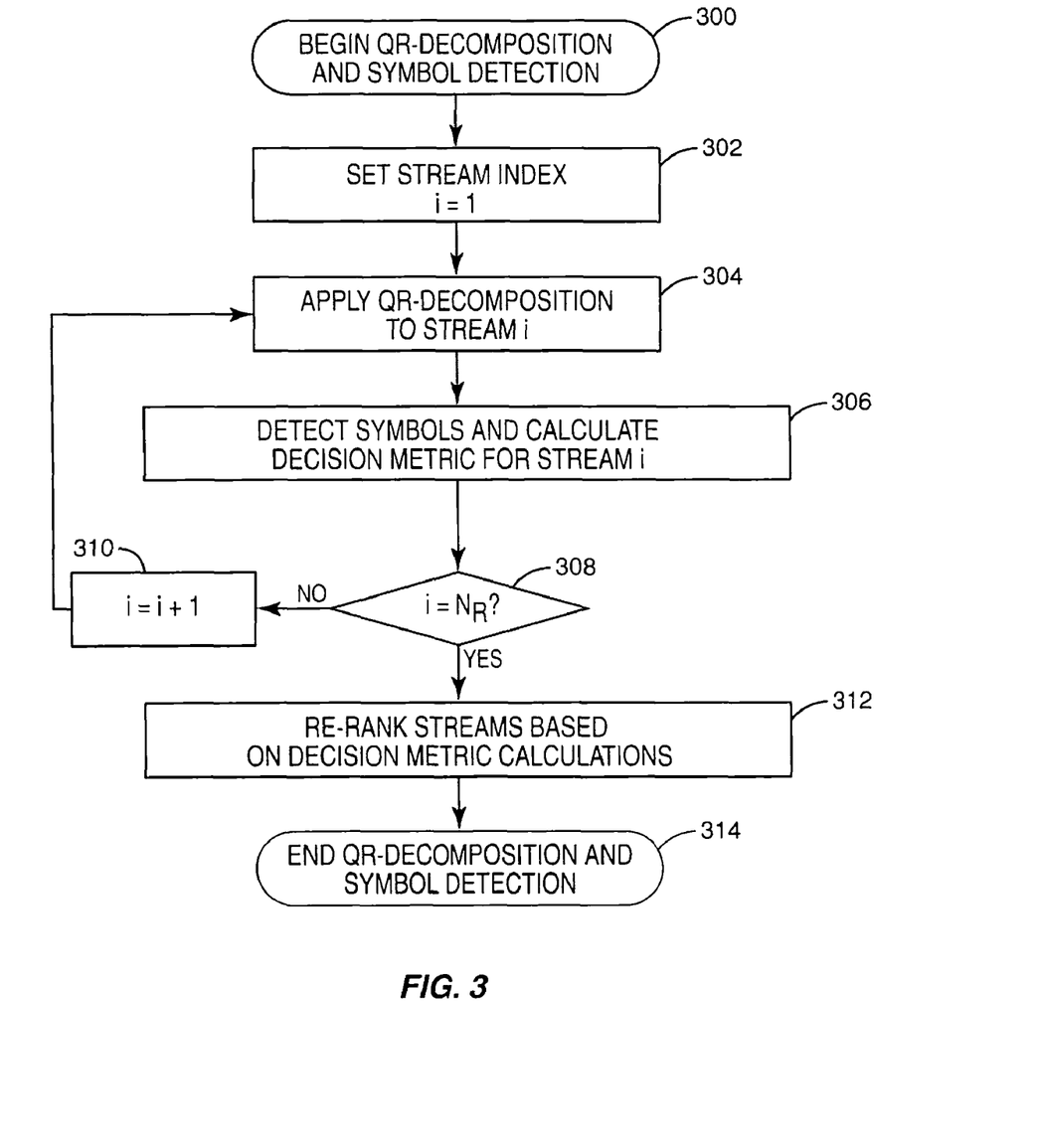
FIG. 3 is a logic flow diagram of an embodiment of processing logic for QR-decomposing received signal streams.

FIG. 3 illustrates an embodiment of processing logic for QR-decomposing the baseband signal streams $x_1(n), x_2(n), \ldots, x_R(n)$. The first baseband processor stage 108 begins the QR-decomposition and symbol detection process (Step 300). The signal stream index i is set to i=1 so that the highest ranking signal stream is selected first for processing (Step 302). The signal streams may be initially ranked based on received power. Regardless, the first stage 108 applies QR-decomposition to the highest ranking signal stream $x_1(n)$ (Step 304). To illustrate the QR-decomposition process, the composite baseband signal vector $x = [x_1(n), x_2(n), \ldots x_R(n)]^T$ can be expressed in matrix form as given by:

$$x = Hc + n \quad (2)$$

where H is a channel response matrix, c is a matrix (column vector) of transmitted signal streams and n is an additive noise term at each receive antenna. For the case of four transmit and four receive antennas, x can be denoted as:

$$\begin{bmatrix} x_1 \\ x_2 \\ x_3 \\ x_4 \end{bmatrix} = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \begin{bmatrix} c_1 \\ c_2 \\ c_3 \\ c_4 \end{bmatrix} + \begin{bmatrix} n_1 \\ n_2 \\ n_3 \\ n_4 \end{bmatrix} \qquad (2)'$$

As described previously, any number of transmit and receive antennas can be considered. In general, x has a size of R×1, H has a size of R×T and c has a size of T×1, where R is the number of receive antennas 102, T is the number of transmit antennas and possibly IRT.

Furthermore, $h_{j,i}$ the matrix element of H, denotes the channel response between the jth transmit antenna and the ith receive antenna 102. Again take for example the case of four transmit and receive antennas 102. In order to perform QR decomposition to get $c_1$ at $x_4$ with no interference from $c_2$, $c_3$ and $c_4$, equation (2)' is modified as:

$$\begin{bmatrix} x_1 \\ x_2 \\ x_3 \\ x_4 \end{bmatrix} = \begin{bmatrix} h_{41} & h_{31} & h_{21} & h_{11} \\ h_{42} & h_{32} & h_{22} & h_{12} \\ h_{43} & h_{33} & h_{23} & h_{13} \\ h_{44} & h_{34} & h_{24} & h_{14} \end{bmatrix} \begin{bmatrix} c_4 \\ c_3 \\ c_2 \\ c_1 \end{bmatrix} + \begin{bmatrix} n_1 \\ n_2 \\ n_3 \\ n_4 \end{bmatrix} \qquad (3)$$

or $$x = H_1 c_1 + n \qquad (3)'$$

where $H_1 = [h_4, h_3, h_2, h_1]$ and $h_i = [h_{j,1}, h_{j,2}, h_{j,3}, h_{j,4}]^T$. $c_1$ is generated by interchanging row component according to $H_1$. QR-decomposing $H_1$ yields the unitary matrix $Q_1$ and upper-triangular matrix $R_1$. The multiplication of the Hermitian matrix $Q_1^H$ and the composite baseband signal x is given by:

$$y = Q_1^H x \qquad (4)$$
$$= R_1 c_1 + \eta_1$$

where:

$$\eta_1 = Q_1^H n \qquad (5)$$

Equations (4) and (5) can be arranged as:

$$\begin{bmatrix} y_1 \\ y_2 \\ y_3 \\ y_4 \end{bmatrix} = \begin{bmatrix} r_{41} & r_{31} & r_{21} & r_{11} \\ 0 & r_{32} & r_{22} & r_{12} \\ 0 & 0 & r_{23} & r_{13} \\ 0 & 0 & 0 & r_{14} \end{bmatrix} \begin{bmatrix} c_4 \\ c_3 \\ c_2 \\ c_1 \end{bmatrix} + \begin{bmatrix} \eta_{11} \\ \eta_{12} \\ \eta_{13} \\ \eta_{14} \end{bmatrix} \qquad (6)$$

where the fourth row from equation (6) is given by:

$$y_4 = r_{14} c_1 + \eta_{14} \qquad (7)$$

As can be seen from equation (7), the fourth row has no interference from transmitted signal streams $c_j$ where $j \neq 1$. Similarly, $H_2 = [h_3, h_4, h_1, h_2]$ and $c_2 = [c_3\ c_4\ c_1\ c_2]^T$, $H_3 = [h_4, h_1, h_2, h_3]$ and $c_3 = [c_4\ c_1\ c_2\ c_3]^T$ and $H_4 = [h_1, h_2, h_3, h_4] = H$ and $c_4 = [c_1\ c_2\ c_3\ c_4]^T = c$. In turn, interference-free terms for $c_2$, $c_3$ and $c_4$ can likewise be determined based on equations (4)-(6). In the same manner, it is possible to make a QR-decomposition to get $c_w$ at $x_z$. Any desirable metric may be used to determine which receive antenna stream $x_z$ is QR-decomposed to get $c_w$. In one embodiment, this determination is based on received pilot power for each stream which would be allocated to have no interference on each other. In another embodiment, $c_w$ is obtained by decomposing at for all z (1, 2, ..., R) and will be selected which has the maximum estimated SINR.

The first baseband processor stage 108 detects symbols $\hat{s}_{1,1}$ and calculates the decision metric $m_{1,1}$ for the first signal stream $x_1(n)$ based on the QR-decomposition results $y_4$ (Step 306). The first stage 108 then determines whether all signal streams have been QR-decomposed as described above (Step 308). If not, the stream index is incremented (Step 310) and the QR-decomposition process repeated for each remaining signal stream (Steps 304-306). The signal streams may be optionally re-ranked based on the decision metric calculations after all signal streams have been QR-decomposed (Step 312). In one embodiment, LLR is used as the decision metric. In another embodiment, the decision metric is a SINR (signal to interference-plus-noise ratio). In yet another embodiment, the Modulation and Coding Set (MCS) associated with each signal stream is used as the decision metric. This way, soft serial interference cancellation can be performed using a signal stream ranking that is based on the decision metric calculations and not received power. Either way, the first stage 108 ends the QR-decomposition and symbol detection processes after all streams have been processed (Step 314). The resulting group of detected symbols $\hat{S}_1(R)$ is provided to the second stage 110 for performing soft serial interference cancellation and symbol re-detection.

Figure 4:
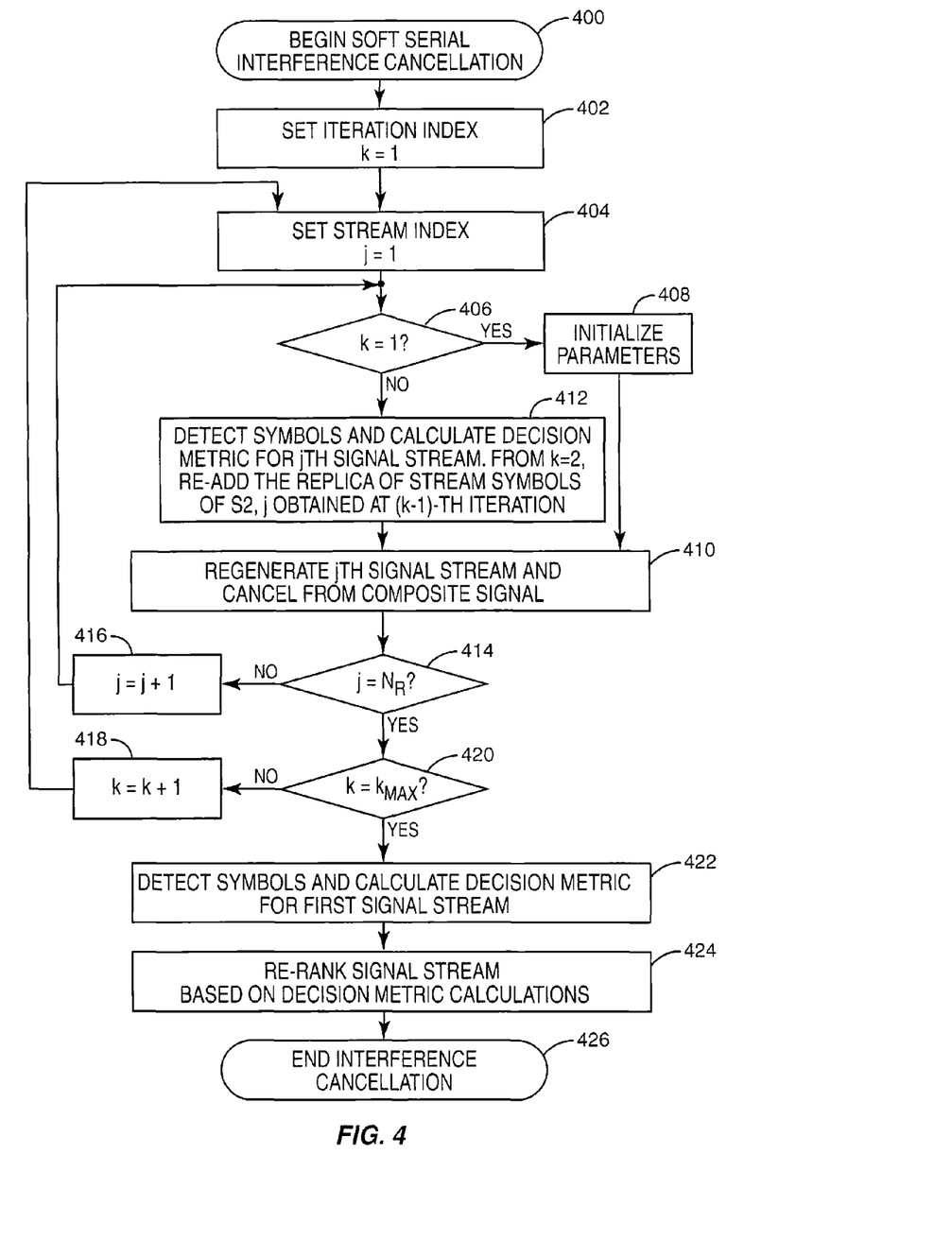
FIG. 4 is a logic flow diagram of an embodiment of processing logic for performing soft serial interference cancellation based on symbols detected using QR-decomposition results.

FIG. 4 illustrates an embodiment of processing logic for performing soft serial interference cancellation on the composite baseband signal x based on the group of symbols detected using the QR-decomposition results. Mainly, each transmitted signal stream is regenerated using the corresponding symbols detected during QR-decomposition and successively subtracted from the composite baseband signal based on signal ranking, e.g., according to equation (1). This way, symbols for the remaining signal streams can be re-detected with reduced or ideally absent interference from higher-ranking signal streams. In more detail, the second baseband processor stage 110 begins the soft serial interference cancellation process (Step 400). An iteration index k is set to k=1(Step 402) and a signal stream index j is set to j=1(Step 404). Interference cancellation is performed for $k_{max}$ iterations, where symbols are detected for all signal streams each iteration. During the first iteration (Step 406), the second stage 110 initializes the interference cancellation parameters because symbols have already been detected and decision metric calculations made by the first stage 108.

A signal regenerator 118 included in or associated with the baseband processor 106 regenerates the first signal stream using the initialized parameters. The second stage 110 cancels the regenerated signal from the composite baseband signal (Step 410). Here, the regenerated signal, also known as replica, which is obtained from the detected signal and estimated channel with a weighting factor based on metric similar to equation (1). Symbols $\hat{s}_{2,2}$ are then detected and the decision metric calculated $m_{2,2}$ for the next highest ranking signal stream with reduced or ideally absent interference from the highest ranking signal stream (Step 412). This process continues until symbols for all signal streams have been re-detected and cancelled from the composite baseband signal (Step 414), incrementing the signal stream index j each time (Step 416). Eventually, all signal streams are detected and successively cancelled from the composite signal. When this occurs, the iteration index k is incremented by one (Step 418) and the interference cancellation process is repeated once again for all streams (Steps 406-416). The symbol estimates $\hat{s}_{2,1} \hat{s}_{2,2}, \ldots \hat{s}_{2,R}$ and decision metric calculations $m_2(R)$ are potentially refined each time the iteration index is incremented. Eventually, the desired number of interference cancellation iterations is achieved (Step 420). From the second iteration on (from k=2 in FIG. 4), for re-detection of $\hat{s}_{2,j}$, the replica of the jth detected symbol stream at the last (k−1) iteration $\hat{s}_{2,j}$ is re-added so that the jth stream can be re-detected during subsequent iterations k(2, 3, 4 . . . ).

At this point, symbols $\hat{s}_{2,j}$ are re-detected and the decision metric $m_{2,1}$ re-calculated for the highest ranking stream (Step 422). This compensates for the initialization process performed when k=1(Steps 406 and 408). The second baseband processor stage 110 may optionally re-rank the streams based on the new decision metric calculations (Step 424). The soft serial interference cancellation process is then terminated (Step 426). The resulting group of detected symbols $\hat{S}_2(R)$ and the decision metric calculations $M_2(R)$ are provided to the third stage 112 for determining whether soft serial interference cancellation improves symbol detection accuracy.

Figure 5:
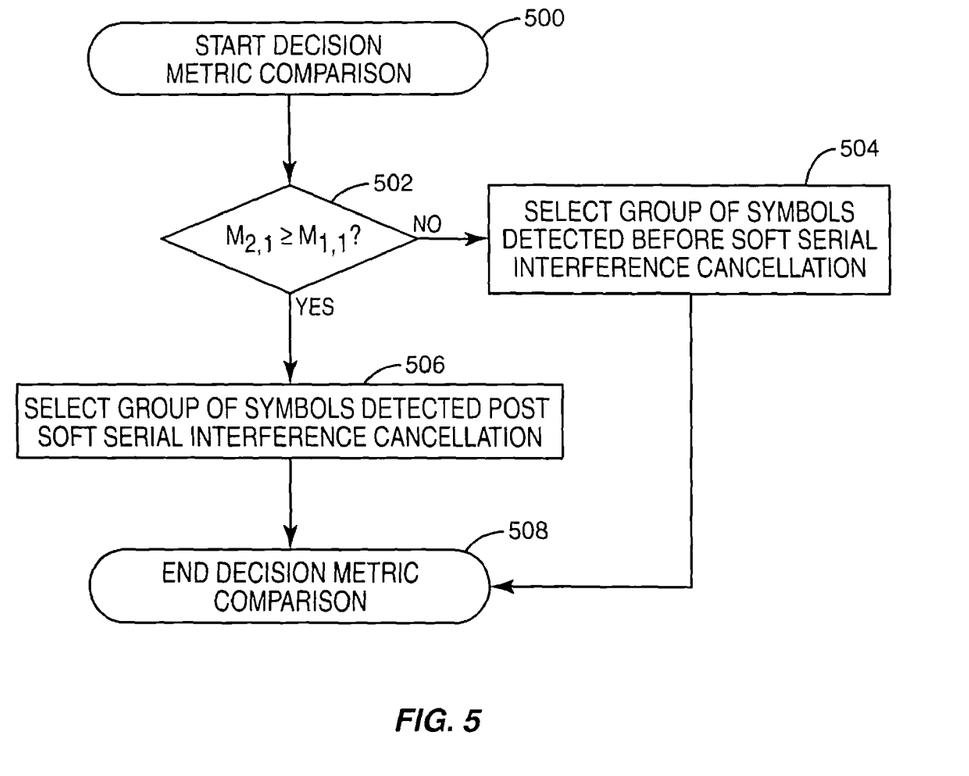
FIG. 5 is a logic flow diagram of an embodiment of processing logic for determining whether symbol detection is more accurate with or without soft serial interference cancellation.

FIG. 5 illustrates an embodiment of processing logic for determining whether symbol detection is more accurate with or without soft serial interference cancellation. Mainly, the third baseband processor stage 112 compares the different decision metric calculations provided by the first and second stages 108, 110 for at least one of the signal streams to determine whether soft serial interference cancellation improves symbol detection accuracy. The third stage 112 begins the symbol detection accuracy determination process (Step 500). In one embodiment, the third stage 112 compares the different decision metric calculations for the m highest ranking signal streams. In another embodiment, the third stage 112 compares the decision metric calculation for the highest ranking signal stream post interference cancellation ($m_{2,1}$) to the decision metric calculation for the highest ranking signal stream pre interference cancellation ($m_{1,1}$) (Step 502).

Either way, the symbols $\hat{S}_1(R)$ detected by the first stage 108 before soft serial interference cancellation are selected for decoding if the decision metric indicates they are more accurate (Step 504). Otherwise, the second group of symbols $\hat{S}_2(R)$ detected by the second stage 110 is selected for decoding (Step 506). The symbol detection accuracy determination process then ends (Step 508). The selected group of symbols is provided to the fourth baseband processor stage 114 for decoding.

Figure 6:
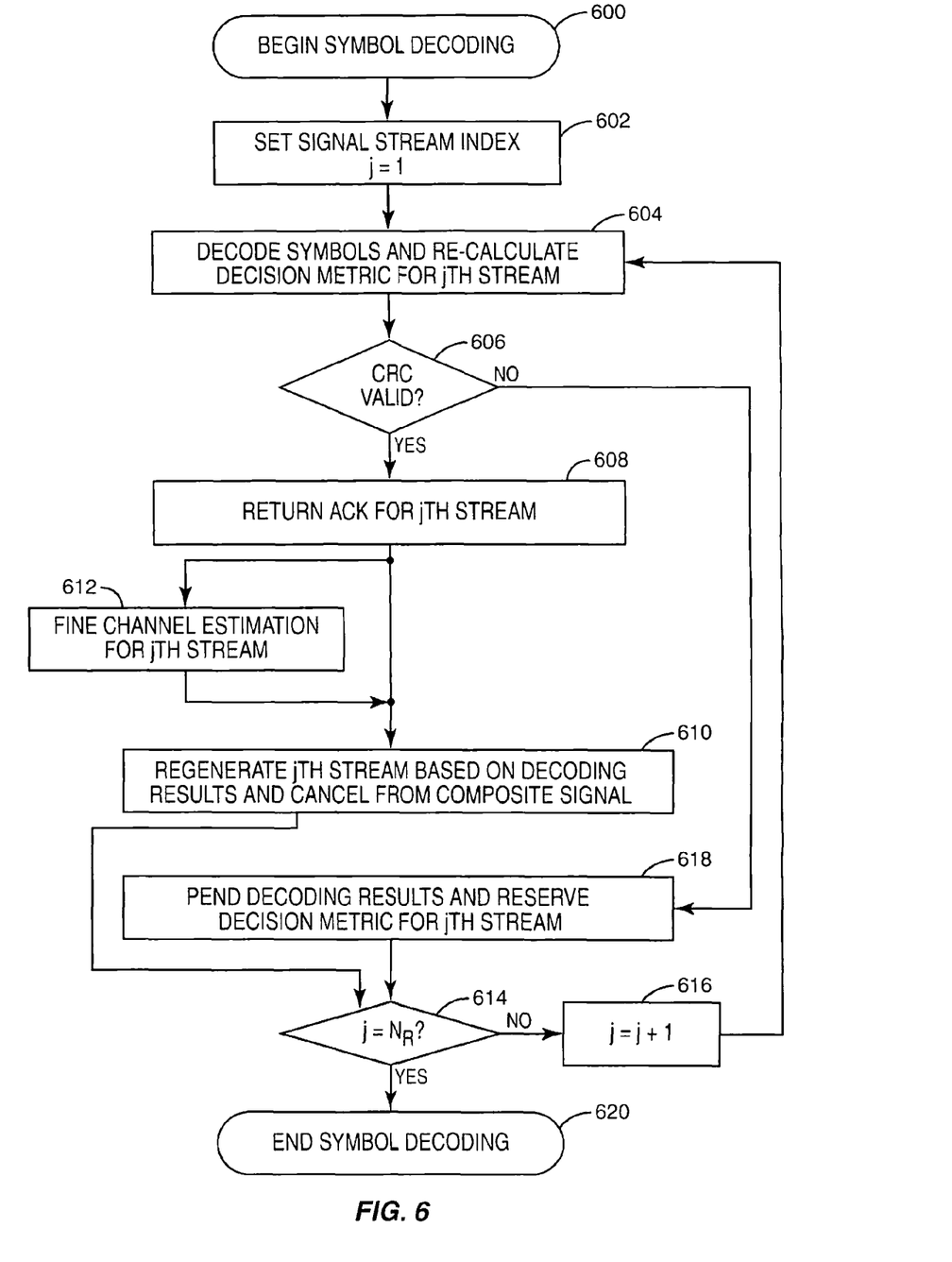
FIG. 6 is a logic flow diagram of an embodiment of processing logic for decoding symbol streams.

FIG. 6 illustrates an embodiment of processing logic for decoding the selected group of symbol streams. Mainly, the fourth baseband processor stage 114 decodes the symbols provided by the third stage 112, attempting to re-decode unsuccessfully decoded symbol streams at least once. This way, symbol detection accuracy improves while reducing the number of signal retransmission requests issued by the receiver 100. In more detail, the fourth stage 114 begins the symbol decoding process (Step 600). A signal stream index j is set to j=1 so that the highest ranking signal stream is processed first (Step 602). The symbols associated with the first stream are decoded and the decision metric recalculated (Step 604). The fifth baseband processor stage 116 calculates a CRC value based on the symbol decoding results $\hat{d}_1$ for the first signal stream.

A controller 120 included in or associated with the baseband processor 106 determines whether the CRC value is valid (Step 606). If valid, the baseband processor 106 generates a message such as an Acknowledgement (ACK) message indicating the first signal stream was successfully decoded (Step 608). When the ACK message is actually sent depends on the Hybrid Automatic Repeat-Request (HARQ) protocol. All streams may be acknowledged in the same ACK message or in different messages. Regardless, the signal regenerator 118 reproduces the first signal stream using the successfully decoded symbols $\hat{d}_1$ and the fourth stage 114 cancels the regenerated signal from the composite baseband signal (Step 610). This way, the remaining symbol streams can be decoded with reduced or ideally absent interference from the first stream. Optionally, the controller 120 instructs a fine channel estimator 122 included in or associated with the baseband processor 106 to calculate a fine channel estimate $\hat{h}_1^{fine}$ associated with the first signal stream as is well known in the art (Step 612) (e.g., well known as the decision feedback approach). The fine channel estimate is highly accurate and is used to re-generate the first stream, e.g., by substituting the fine channel estimate $\hat{h}_1^{fine}$ for $H_j^{st}$ in equation (1). Using a more accurate channel estimate improves cancellation of the re-generated signal from the composite signal.

Regardless, the symbol decoding process (Steps 604-610) continues for each signal stream (Steps 614 and 616). If the CRC value calculated for a particular signal stream is invalid, the signal stream is not regenerated and cancelled from the composite signal (Step 606). Instead, its decoding results pend and its decision metric calculation saved for subsequent use (step 618). The decoding results are not used because the signal stream was incorrectly decoded. Otherwise, decoding errors are compounded if they are regenerated and cancelled from the composite signal. The fourth stage 114 ends the symbol decoding process after each symbol stream is initially decoded (Step 620). However, the receiver 100 does not automatically generate a signal retransmission request for each unsuccessfully decoded signal stream. Instead, the baseband processor 106 attempts at least once to re-decode the unsuccessfully decoded signal streams before issuing retransmission requests such as NACKs.

Figure 7:
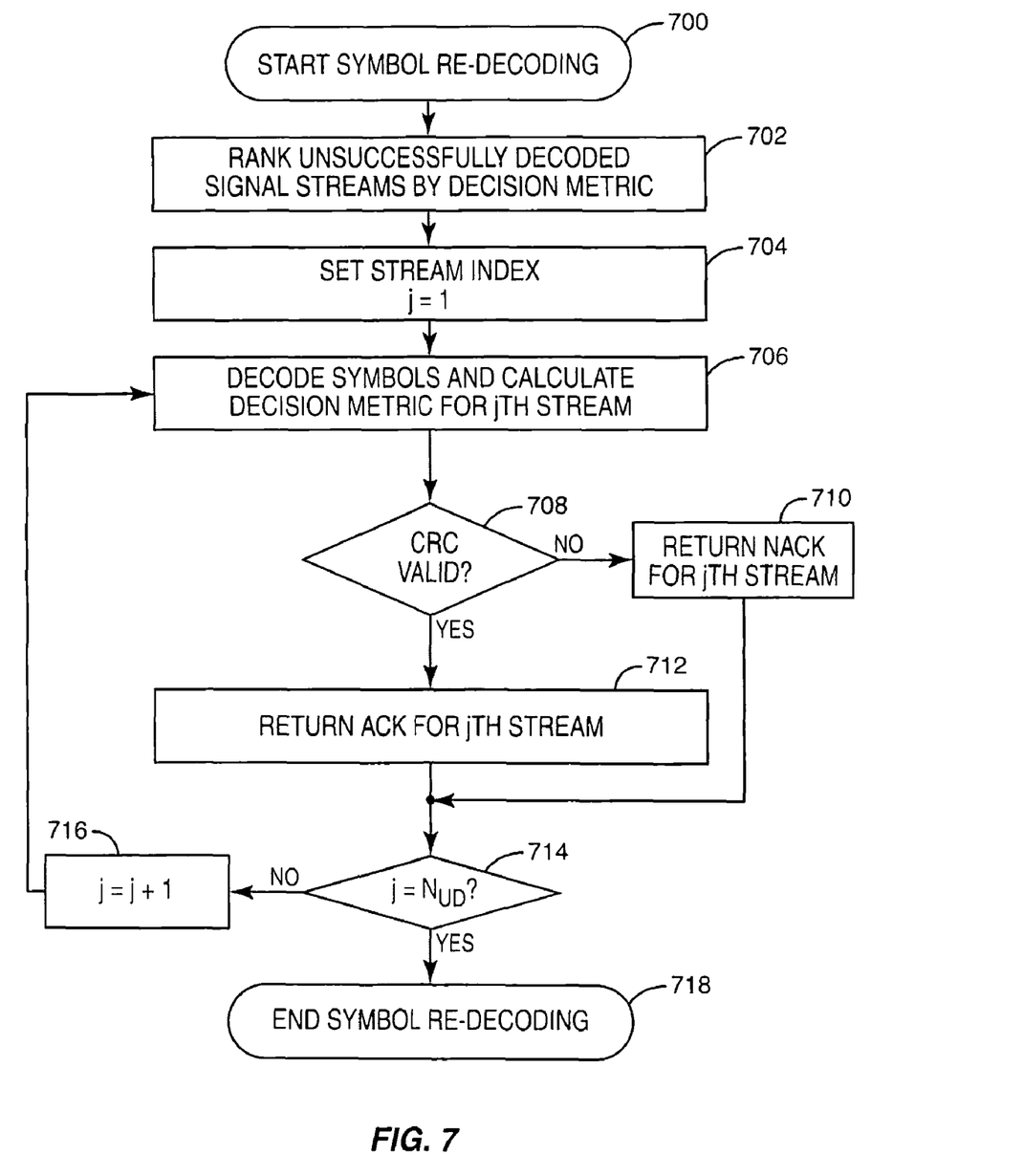
FIG. 7 is a logic flow diagram of an embodiment of processing logic for re-decoding symbol streams.

FIG. 7 illustrates an embodiment of processing logic for re-decoding symbol streams that were initially decoded incorrectly. This way, the receiver 100 has at least one more opportunity to re-decode problematic signal streams before requesting retransmission. The fourth baseband processor stage 114 re-initiates the symbol re-decoding process (Step 700). The unsuccessfully decoded signal streams are re-ranked based on the decision metric calculations so that the highest ranking signal stream is processed first (Step 702). This improves the likelihood that some or all of the problematic signal streams will be correctly decoded.

A signal stream index j is set to j=1(Step 704). Symbols are decoded and the decision metric recalculated for the jth signal stream (Step 706). The fifth stage 116 calculates a CRC value for the jth signal stream and the controller 120 determines whether the CRC value is valid (Step 708). This time, the receiver 100 issues a retransmission request if the symbols remain incorrectly decoded (Step 710). Otherwise, the receiver 100 issues an acknowledgement message indicating successful decoding (Step 712) if the CRC value is valid. The re-decoding process continues for the remaining signal streams until the last stream (as indicated by $N_{UD}$) is re-decoded (Steps 714 and 716). The fourth stage 114 then ends the symbol re-decoding process (Step 718). The symbol re-decoding process may be repeated as many times as desired, each iteration eliciting steps 700-718 of FIG. 7 so long as decision metric increases each iteration, even if the CRC value is invalid within the maximum number of trials which depends on processing delay, etc.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a composite signal including a plurality of component signal streams received by a multi-antenna receiver, comprising:
    using QR-decomposition to detect symbols and calculate a decision metric for each of the signal streams;
    performing soft serial interference cancellation on the composite signal based on the symbols detected for different ones of the signal streams and a ranking of the signal streams by regenerating each signal stream from the corresponding symbols detected using QR-decomposition and cancelling each regenerated signal stream from the composite signal in order based on rank;
    re-detecting the symbols and re-calculating the decision metric for each signal stream based on the soft interference cancellation results;
    comparing the different decision metric calculations for at least one of the signal streams to determine whether symbol detection is more accurate with or without soft serial interference cancellation; and
    decoding the signal streams using the symbols detected based on the soft serial interference cancellation results when symbol detection is determined to be more accurate with soft serial interference cancellation, otherwise based on the symbols detected using QR-decomposition.

2. The method of claim 1, wherein using QR-decomposition to detect symbols and calculate a decision metric for each of the signal streams comprises QR-decomposing the signal streams to obtain a unitary matrix and a triangular matrix used to detect the symbols and calculate the decision metric for each signal stream.

3. The method of claim 2, wherein QR-decomposing the signal streams to obtain a unitary matrix and a triangular matrix comprises QR-decomposing the signal streams based on received pilot power for each stream.

4. The method of claim 2, wherein QR-decomposing the signal streams to obtain a unitary matrix and a triangular matrix comprises QR-decomposing the signal streams and then selecting the signal stream having the maximum estimated signal to interference-plus-noise ratio.

5. The method of claim 1, wherein the symbols are detected and the decision metric calculated for all signal streams using QR-decomposition before performing soft serial interference cancellation on the composite signal.

6. The method of claim 1, wherein a higher ranking signal stream is regenerated and cancelled from the composite signal before detecting the symbols of a lower ranking signal stream so that the symbols of the lower ranking signal stream can be detected from the composite signal absent interference from the higher ranking signal stream.

7. The method of claim 1, further comprising re-ranking the signal streams based on the decision metric calculated for the different signal streams using QR-decomposition, wherein the soft serial interference cancellation is performed based on the re-ranking.

8. The method of claim 1, wherein comparing the different decision metric calculations for at least one of the signal streams to determine whether symbol detection is more accurate with or without soft serial interference cancellation comprises comparing the different decision metric calculations for one or more of the highest ranking signal streams.

9. The method of claim 1, wherein decoding the signal streams comprises:
    decoding the signal streams in order based on rank;
    successively cancelling successfully decoded signal streams from the composite signal so that remaining non-decoded signal streams can be subsequently decoded from the composite signal absent interference from the successfully decoded signal streams; and
    attempting at least once to re-decode unsuccessfully decoded signal streams.

10. The method of claim 9, further comprising:
    performing fine channel estimation for successfully decoded signal streams; and
    using the corresponding fine channel estimation results to cancel successfully decoded signal streams from the composite signal.

11. The method of claim 9, further comprising reporting whether the signal streams have been successfully or unsuccessfully decoded after attempting at least once to re-decode unsuccessfully decoded signal streams.

12. The method of claim 9, wherein decoding success is determined based on a cyclic redundancy check (CRC) value determined for each decoded signal stream.

13. The method of claim 12, wherein attempting at least once to re-decode unsuccessfully decoded signal streams comprises attempting to re-decode the unsuccessfully decoded signal streams so long as the decision metric increases each attempt even if one or more of the CRC values is invalid.

14. The method of claim 9, wherein successively cancelling successfully decoded signal streams from the composite signal comprises:
    cancelling a decoded higher ranking signal stream from the composite signal if successfully decoded so that a lower ranking signal stream can be decoded from the composite signal absent interference from the higher ranking signal stream; and
    if the higher ranking signal stream is not successfully decoded, decoding the lower ranking signal stream and cancelling the decoded lower ranking signal stream from the composite signal if successfully decoded so that the higher ranking signal stream can be subsequently re-decoded from the composite signal absent interference from the lower ranking signal stream.

15. A multi-antenna receiver for processing a composite signal including a plurality of component signal streams, comprising a baseband processor configured to:
    use QR-decomposition to detect symbols and calculate a decision metric for each of the signal streams;
    perform soft serial interference cancellation on the composite signal based on the symbols detected for different ones of the signal streams and a ranking of the signal streams by regenerating each signal stream from the corresponding symbols detected using QR-decomposition and cancelling each regenerated signal stream from the composite signal in order based on rank;
    re-detect the symbols and re-calculate the decision metric for each signal stream based on the soft serial interference cancellation results;
    compare the different decision metric calculations for at least one of the signal streams to determine whether symbol detection is more accurate with or without soft serial interference cancellation; and
    decode the signal streams using the symbols detected based on the soft serial interference cancellation results when symbol detection is determined to be more accurate with soft serial interference cancellation, otherwise based on the symbols detected using QR-decomposition.

16. The multi-antenna receiver of claim 15, wherein the baseband processor is configured to QR-decompose the signal streams to obtain a unitary matrix and a triangular matrix used to detect the symbols and calculate the decision metric for each signal stream.

17. The multi-antenna receiver of claim 15, wherein the baseband processor is configured to detect the symbols and calculate the decision metric for all signal streams using QR-decomposition before performing soft serial interference cancellation on the composite signal.

18. The multi-antenna receiver of claim 15, wherein the baseband processor is configured to regenerate and cancel a higher ranking signal stream from the composite signal before detecting the symbols of a lower ranking signal stream so that the symbols of the lower ranking signal stream can be detected from the composite signal absent interference from the higher ranking signal stream.

19. The multi-antenna receiver of claim 15, wherein the baseband processor is configured to re-rank the signal streams based on the decision metric calculated for the different signal streams using QR-decomposition, wherein the soft serial interference cancellation is performed based on the re-ranking.

20. The multi-antenna receiver of claim 15, wherein the baseband processor is configured to:
decode the signal streams in order based on rank;
successively cancel successfully decoded signal streams from the composite signal so that remaining non-decoded signal streams can be subsequently decoded from the composite signal absent interference from the successfully decoded signal streams; and
attempt at least once to re-decode unsuccessfully decoded signal streams.

21. The multi-antenna receiver of claim 20, wherein the baseband processor is configured to:
perform fine channel estimation for successfully decoded signal streams; and
use the corresponding fine channel estimation results to cancel successfully decoded signal streams from the composite signal.

22. The multi-antenna receiver of claim 20, wherein the baseband processor is configured to determine decoding success based on a cyclic redundancy check (CRC) value calculated for each decoded signal stream.

23. The multi-antenna receiver of claim 20, wherein the baseband processor is configured to:
cancel a decoded higher ranking signal stream from the composite signal if successfully decoded so that a lower ranking signal stream can be decoded from the composite signal absent interference from the higher ranking signal stream; and
if the higher ranking signal stream is not successfully decoded, decode the lower ranking signal stream and cancelling the decoded lower ranking signal stream from the composite signal if successfully decoded so that the higher ranking signal stream can be subsequently re-decoded from the composite signal absent interference from the lower ranking signal stream.

* * * * *

UNITED STATES PATENT AND TRADEMARK OFFICE
CERTIFICATE OF CORRECTION

PATENT NO. : 8,315,343 B2
APPLICATION NO. : 12/808232
DATED : November 20, 2012
INVENTOR(S) : Murai et al.

It is certified that error appears in the above-identified patent and that said Letters Patent is hereby corrected as shown below:

On the Title Page, in Field (75), under "Inventors", in Column 1, Line 2, delete "Goransson," and insert -- Göransson, --, therefor.

Title Page 2, in Field (56), under "OTHER PUBLICATIONS", in Column 1, Line 2, delete "DD-CDMA" and insert -- DS-CDMA --, therefor.

In Column 5, Line 25, delete "$m_{2,1}, m_{2,2}, m_{2,R}$" and insert -- $m_{2,1}, m_{2,2},..., m_{2,R}$ --, therefor.

In Column 7, Line 12, delete "IRT." and insert -- R≥T. --, therefor.

In Column 7, Line 44, in Equation (5), delete "$\eta_1 = Q_1^n$" and insert -- $\eta_1 = Q_1^H n$ --, therefor.

In Column 7, Line 58, delete "$H_2=[h_3, h_4, h_1\ h_2]$" and insert -- $H_2 = [h_3, h_4, h_1, h_2]$ --, therefor.

In Column 7, Lines 58-59, delete "$H_3=[h_4, h_1\ h_2, h_3]$" and insert -- $H_3 = [h_4, h_1, h_2, h_3]$ --, therefor.

In Column 8, Line 66, delete "$\hat{s}_{2,1} \hat{s}_{2,2}, \ldots \hat{s}_{2,R}$" and insert -- $\hat{s}_{2,1}, \hat{s}_{2,2}, \ldots, \hat{s}_{2,R}$ --, therefor.

In Column 9, Line 7, delete "$\hat{s}_{2,j}$" and insert -- $\hat{s}_{2,1}$ --, therefor.

In Column 10, Line 13, delete "$H_j^{st}$" and insert -- $H_j^{est}$ --, therefor.

Signed and Sealed this
Second Day of April, 2013

Teresa Stanek Rea
*Acting Director of the United States Patent and Trademark Office*